(12) United States Patent
Sayers et al.

(10) Patent No.: US 11,337,407 B2
(45) Date of Patent: May 24, 2022

(54) PET COLLAR

(71) Applicant: Radio Systems Corporation, Knoxville, TN (US)

(72) Inventors: Kevin Michael Sayers, Knoxville, TN (US); Kevin L. Tolliver, Knoxville, TN (US); Kevin Zinn, Knoxville, TN (US); Jonathan Huber, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 154 days.

(21) Appl. No.: 16/913,895

(22) Filed: Jun. 26, 2020

(65) Prior Publication Data

US 2021/0400917 A1    Dec. 30, 2021

(51) Int. Cl.
*A01K 27/00* (2006.01)
*G01R 5/04* (2006.01)
*G01L 5/04* (2006.01)

(52) U.S. Cl.
CPC .......... *A01K 27/005* (2013.01); *A01K 27/001* (2013.01); *G01L 5/047* (2013.01)

(58) Field of Classification Search
CPC .... A01K 27/005; A01K 27/00; A01K 27/001; G01L 5/047; G01L 5/04; G01L 5/045; B60R 2022/4841
See application file for complete search history.

(56) References Cited

U.S. PATENT DOCUMENTS

| | | |
|---|---|---|
| 378,153 A | 2/1888 | Tiffany |
| 597,317 A | 1/1898 | Ellsworth |
| 1,020,242 A * | 3/1912 | Wilson ................. A01K 27/001 119/863 |
| 1,277,052 A | 8/1918 | Dunn |
| 1,685,435 A | 9/1928 | Philbrick |
| 1,800,421 A | 4/1931 | Wickersham et al. |
| 2,026,383 A | 12/1935 | Gyulay |
| 2,605,744 A | 8/1952 | Urbanski |
| 2,817,393 A | 12/1957 | Mitchell |
| 2,826,172 A | 3/1958 | Buckle et al. |

(Continued)

FOREIGN PATENT DOCUMENTS

| | | |
|---|---|---|
| DE | 3837507 A1 | 1/1990 |
| DE | 29618168 U1 | 12/1996 |

(Continued)

*Primary Examiner* — Kristen C Hayes
(74) *Attorney, Agent, or Firm* — Baker, Donelson, Bearman, Caldwell & Berkowitz PC

(57) ABSTRACT

A pet collar has an adjustable length strap and a buckle. The buckle has a receiver and a clip releasably coupled to the receiver. The receiver includes a catch portion coupleable to the clip and a tension indicator portion. The tension indicator portion has two side walls defining a shuttle channel. Each side wall has a top surface having a first mark, a second mark, a third mark, and a fourth mark which have color coding. The shuttle channel is configured to slidably receive a reciprocating tensioning shuttle therein. The tensioning shuttle includes two side wall and a compression spring. Each side wall also includes a top flange overlaying the receiver side walls that includes a first viewing window and a second viewing window. The viewing windows alignment with the underlying marks indicated the tension of the collar upon the pet.

21 Claims, 3 Drawing Sheets

(56) References Cited

U.S. PATENT DOCUMENTS

| | | |
|---|---|---|
| 3,310,034 A | 3/1967 | Dishart |
| 3,768,445 A | 10/1973 | Sorrels |
| D245,350 S | 8/1977 | Geary |
| 4,060,056 A | 11/1977 | Maietta |
| 4,106,266 A | 8/1978 | Hibbert |
| 4,337,610 A | 7/1982 | Taylor |
| 4,483,275 A | 11/1984 | De Groot |
| 4,495,753 A | 1/1985 | Simpson |
| 4,530,309 A | 7/1985 | Collins |
| 4,553,633 A | 11/1985 | Armstrong et al. |
| 4,559,906 A | 12/1985 | Smith |
| 4,565,055 A | 1/1986 | Simpson |
| 4,566,255 A | 1/1986 | Degroot |
| 4,676,198 A | 6/1987 | Murray |
| 4,964,369 A | 10/1990 | Sporn |
| 4,969,419 A | 11/1990 | Fong |
| 5,094,062 A | 3/1992 | Clark |
| 5,146,875 A | 9/1992 | Bolt |
| 5,154,660 A | 10/1992 | Snyder et al. |
| 5,199,383 A | 4/1993 | Lagana |
| 5,247,905 A | 9/1993 | Arakawa |
| 5,305,710 A | 4/1994 | Ward, Jr. |
| 5,325,819 A | 7/1994 | Krauss |
| 5,329,885 A | 7/1994 | Sporn |
| 5,335,627 A | 8/1994 | Bandimere |
| 5,383,426 A | 1/1995 | Krauss |
| 5,471,953 A | 12/1995 | Sporn |
| 5,485,810 A | 1/1996 | Sporn |
| 5,503,113 A | 4/1996 | Knight |
| 5,511,515 A | 4/1996 | Brown et al. |
| 5,529,018 A | 6/1996 | Butts |
| 5,531,187 A | 7/1996 | Ward |
| 5,611,298 A | 3/1997 | Sporn |
| 5,676,093 A | 10/1997 | Sporn |
| 5,690,059 A | 11/1997 | Woods |
| 5,706,764 A | 1/1998 | Irbinskas |
| 5,713,308 A | 2/1998 | Holt, Jr. |
| 5,743,216 A | 4/1998 | Holt, Jr. |
| 5,785,010 A | 7/1998 | Koch |
| 5,791,295 A | 8/1998 | Schmid et al. |
| 5,794,571 A | 8/1998 | Goldberg |
| 5,845,606 A | 12/1998 | Hartman |
| 5,893,339 A | 4/1999 | Liu |
| 5,896,831 A | 4/1999 | Alpert |
| 5,911,200 A | 6/1999 | Clark |
| 5,915,335 A | 6/1999 | Holt, Jr. |
| 5,937,794 A | 8/1999 | Hediger |
| 5,947,062 A | 9/1999 | Hoffman et al. |
| 5,967,095 A | 10/1999 | Greves |
| 5,992,352 A | 11/1999 | Borchelt et al. |
| 6,085,694 A | 7/2000 | Simon |
| 6,101,979 A | 8/2000 | Wilson et al. |
| 6,161,505 A | 12/2000 | Noguero |
| 6,167,844 B1 | 1/2001 | Cantrell et al. |
| 6,213,057 B1 | 4/2001 | Franco et al. |
| 6,295,795 B1 | 10/2001 | Ehrmann |
| 6,314,915 B1 | 11/2001 | Pope et al. |
| 6,354,247 B1 | 3/2002 | Andrews |
| 6,367,424 B1 | 4/2002 | Higham |
| 6,401,666 B1 | 6/2002 | Kircher |
| 6,427,635 B1 | 8/2002 | Ballard |
| 6,450,130 B1 | 9/2002 | Goldberg |
| 6,463,888 B2 | 10/2002 | Clark |
| 6,543,390 B2 | 4/2003 | Lowery |
| 6,564,754 B1 | 5/2003 | Cohen |
| 6,612,265 B1 | 9/2003 | Birdsong |
| 6,637,377 B2 | 10/2003 | Lobanoff et al. |
| 6,662,755 B2 | 12/2003 | Kato |
| D511,596 S | 11/2005 | Mugford |
| 6,976,453 B2 | 12/2005 | Goudal |
| 7,107,939 B2 | 9/2006 | Lady |
| 7,165,511 B1 | 1/2007 | Brezinski |
| 7,281,363 B2 | 10/2007 | Woerner |
| 7,284,504 B1 | 10/2007 | Purschwitz, Jr. et al. |
| 7,284,505 B1 | 10/2007 | Paxton et al. |
| 7,343,826 B1 * | 3/2008 | Nugent .................. B60R 22/48 |
| | | 73/862.42 |
| 7,357,099 B2 | 4/2008 | Smith et al. |
| 7,891,322 B2 | 2/2011 | Bennett et al. |
| 2005/0006934 A1 * | 1/2005 | Rabeony ............. B60N 2/2809 |
| | | 297/250.1 |
| 2005/0263102 A1 | 12/2005 | Sherman et al. |
| 2006/0064949 A1 | 3/2006 | Chang |
| 2006/0236954 A1 | 10/2006 | Abinanti |
| 2007/0044735 A1 | 3/2007 | Zimmerman |
| 2007/0113798 A1 | 5/2007 | Torjesen |
| 2008/0245317 A1 | 10/2008 | Caldwell |
| 2008/0276880 A1 | 11/2008 | Swisher et al. |
| 2010/0015867 A1 | 1/2010 | Betz et al. |
| 2010/0122667 A1 | 5/2010 | Horgan |
| 2010/0199927 A1 | 8/2010 | Cigard et al. |
| 2011/0308479 A1 | 12/2011 | Kuo |
| 2012/0186537 A1 | 7/2012 | Curtis |
| 2012/0318211 A1 | 12/2012 | Madonna et al. |

FOREIGN PATENT DOCUMENTS

| | | | |
|---|---|---|---|
| DE | 102007055574 A1 | 5/2008 | |
| EP | 1247704 A2 * | 10/2002 | ............ B60N 2/265 |
| EP | 1206905 A3 | 8/2003 | |
| EP | 1552993 A1 * | 7/2005 | ............ B60R 22/48 |
| FR | 2301273 A1 | 9/1976 | |
| FR | 2502962 A1 | 10/1982 | |
| GB | 2195224 A | 4/1988 | |
| GB | 2201874 A | 9/1988 | |
| GE | 2228660 A | 9/1990 | |
| WO | WO-2005041645 A1 | 5/2005 | |

* cited by examiner

PET COLLAR

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

FIELD OF THE INVENTION

The present inventive concept relates to the field of dog collars and harnesses. More particularly, the invention relates to the buckle component of a dog collar or harness.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Most pets, especially dogs and cats, are provided with a collar fitted around the neck of the animal. Typically, these collars are designed so that their lengths may be adjusted to provide the proper sizing of the collar. As a general rule, the collar is supposed to fit about the neck with enough tension upon the collar strap so that a person may comfortably place two fingers between the collar and the animal's neck. Generally this is sufficient for non-electronic pet collars. However, electronic pet collars increasingly require more precise collar tension to ensure correct operation. Users are often hesitant to properly tighten an electronic pet collar to the recommended tension. This can cause performance issues with product function.

Another problem with collars is that most people do not adjust their length once the collar is initially placed on the animal. However, an animal's neck size may vary due to its activity level, dehydration level, seasonal fur coat changes, pet weight, age, and even time of day. Because of these physical changes in the diameter of the animal's neck, the collar may become too tight or too lose upon the animal without the pet owner knowing so. A collar which is too tight may cause discomfort and may lead to choking the animal. A collar which is too lose may allow the animal to remove the collar.

Accordingly, a need exists for a pet collar that can be adjusted for changes in the physical size of a pet's neck and indicate if the collar is properly fitted. It is to the provision of such therefore that the present invention is primarily directed.

BRIEF SUMMARY OF THE INVENTION

A pet collar comprises a flexible strap having a first end and a second end oppositely disposed from the first end, and a buckle having a clip coupled to the first end of the flexible strap and a receiver coupled to the second end of the strap. The receiver has a catch portion removably coupleable to the clip and a tension indicator portion coupled to the catch portion and the flexible strap second end. The tension indicator portion has at least one side wall with at least one position indicator. A tensioning shuttle is coupled for reciprocal movement along the one side wall. The tensioning shuttle has a visual indictor alignable with the at least one position indicator. A spring biases the tensioning shuttle. The flexible strap second end is coupled to the tensioning shuttle. With this construction, the amount of tension of the flexible strap determines the position of the tensioning shuttle along the side wall.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION

Figure 1:
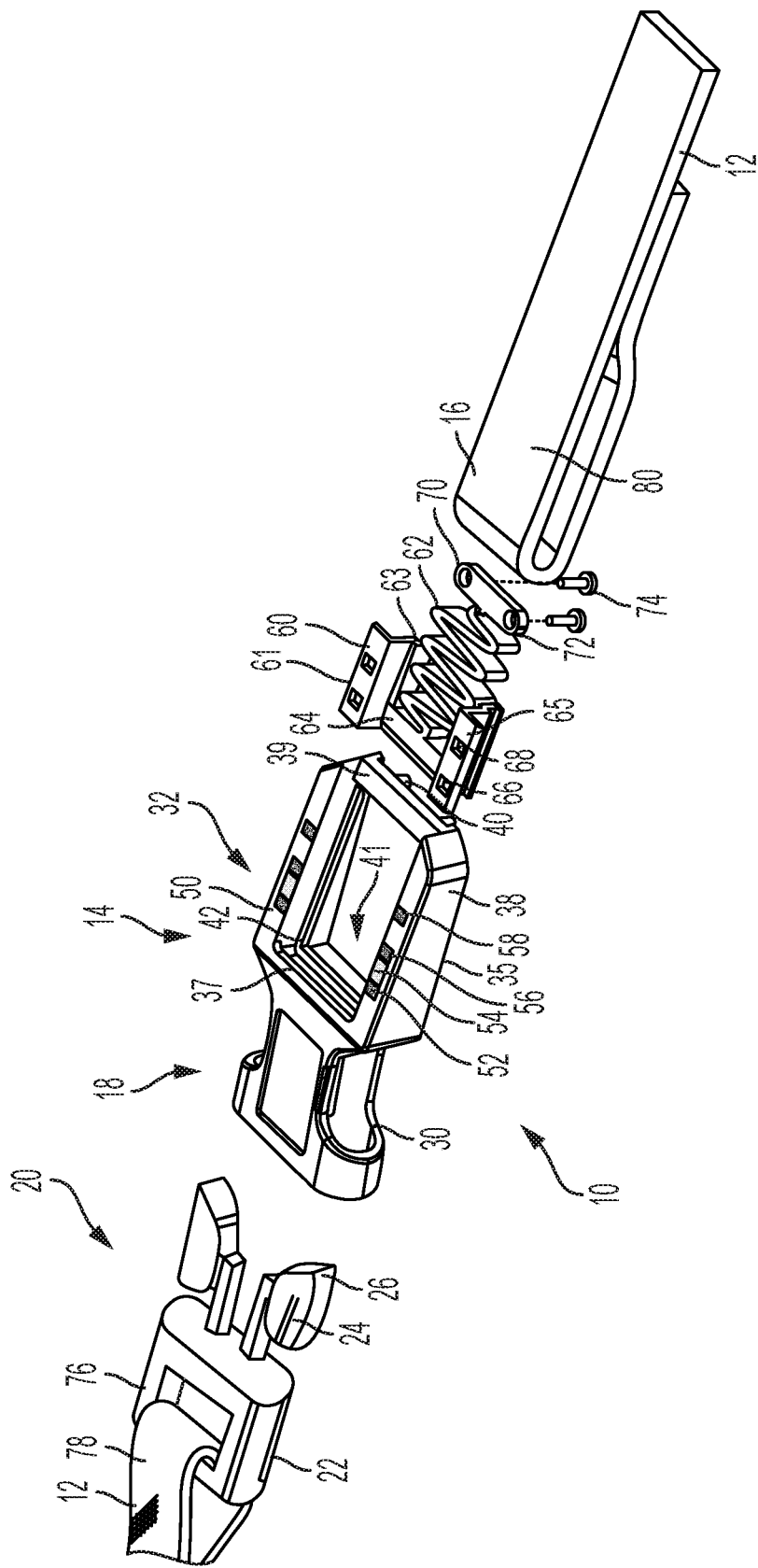
FIG. 1 is an exploded, perspective view of a pet collar embodying principles of the invention in a preferred form.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

With reference next to the drawings, there is a shown a pet collar 10 in a preferred form of the present invention. The pet collar 10 is configured to be worn about the neck of a pet, such as a dog or cat, in conventional fashion. The collar 10 includes an elongated flexible strap 12 and a plastic buckle 14 coupled to opposite ends 16 of the strap 12.

The strap 12 may be made of any conventional material, such as a woven material, plastic, leather, or the like. The strap 12 may include a folded over portion which allows for generally adjusting of the length of the strap 12. The strap 12 may also include a conventional known, unshown D-ring to allow the collar 10 to be coupled to a leash.

The buckle 14 is a two piece, squeeze type release buckle having a first portion, receiving portion or receiver 18 and a second portion, clip portion, or clip 20. The clip 20 includes a coupling base 22 from which extends two resilient prongs 24. The two prongs 24 are designed to be flexed inwardly towards each other during the coupling process to create an outward spring force upon the prongs 24. Each prong 24 terminates at an enlarged latch 26.

The receiver 18 includes a strap coupling portion or catch portion 30 and a tension indicator portion 32. The catch portion 30 cooperates with the clip 20 for releasable engagement or coupling therebetween. The catch portion 30 has a central channel 34 configured to receive the clip prongs 24 therein. With the clip prongs 24 fully positioned within the central channel 34, the prong latches 26 are releasably positioned within two side channels or notches 36 extending laterally from the central channel 34.

The tension indicator portion 32 extends longitudinally from the catch portion 30. The tension indicator portion 32 has a base 35 having an end wall 37, two oppositely disposed side walls 38 and a front wall 39, which in combination define a shuttle opening or channel 41. The shuttle channel 41 has an internal peripheral guide rail, ridge, or tongue 42 extending inwardly from the end wall 37 and two side walls 38. Each side wall 38 has a top surface 50 having a series of position indicators, visual position indicators or tension indicator portions shown in the preferred embodiment as a first mark 52, a second mark 54, a third mark 56, and a fourth mark 58. The first mark 52, third mark 56, and fourth mark 58 have a first color coding, such as the color red, to indicate an improper tension or fit. The second mark 54 has a second color coding, such as green, to indicate a proper tension or fit. The first color is different from the second color so that they are readily discernable. The front wall 39 has two downwardly extending screw mounting bosses 40. The shuttle channel 41 is configured to slidably or movably receive a reciprocating tensioning member, slide or shuttle 60 therein.

The tensioning shuttle 60 includes two oppositely disposed side walls 61, an end wall 64 spanning the side walls 61, and a zig-zag or magazine compression spring 62 extending from the end wall 64 and at least partially positioned between the side walls 61. Each side wall 61 includes a guide channel or groove 63 configured to slidably receive the side wall guide tongue 42 of the base 35. Each side wall 61 also includes a laterally extending top flange 65 overlaying the base side walls 38. Each top flange 65 has a position indicator, visual tension indicator portion, or tension indicator in the form of a first viewing window 66 and a position indicator, visual tension indicator portion, or tension indicator in the form of a second viewing window 67 extending therethrough. The first viewing windows 66 may be aligned with the underlying first marks 52, second marks 54, or third marks 56, depending upon the longitudinal position of the tensioning shuttle 60 relative to the tension indicator portion 32. Similarly, the second viewing windows 68 may be aligned with the underlying third marks 56 and fourth marks 58, depending upon the longitudinal position of the tensioning shuttle 60 relative to the tension indicator portion 32.

The compression spring 62 includes an end mounting plate 70 having two screw mounting holes 72 therethrough. The end mounting plate 70 is mounted to the bottom of the base front wall 39 by passing two mounting screws 74 through the mounting holes 72 of the end mounting plate 70 and threading them into the bosses 40 of the base front wall 39.

Figure 2:
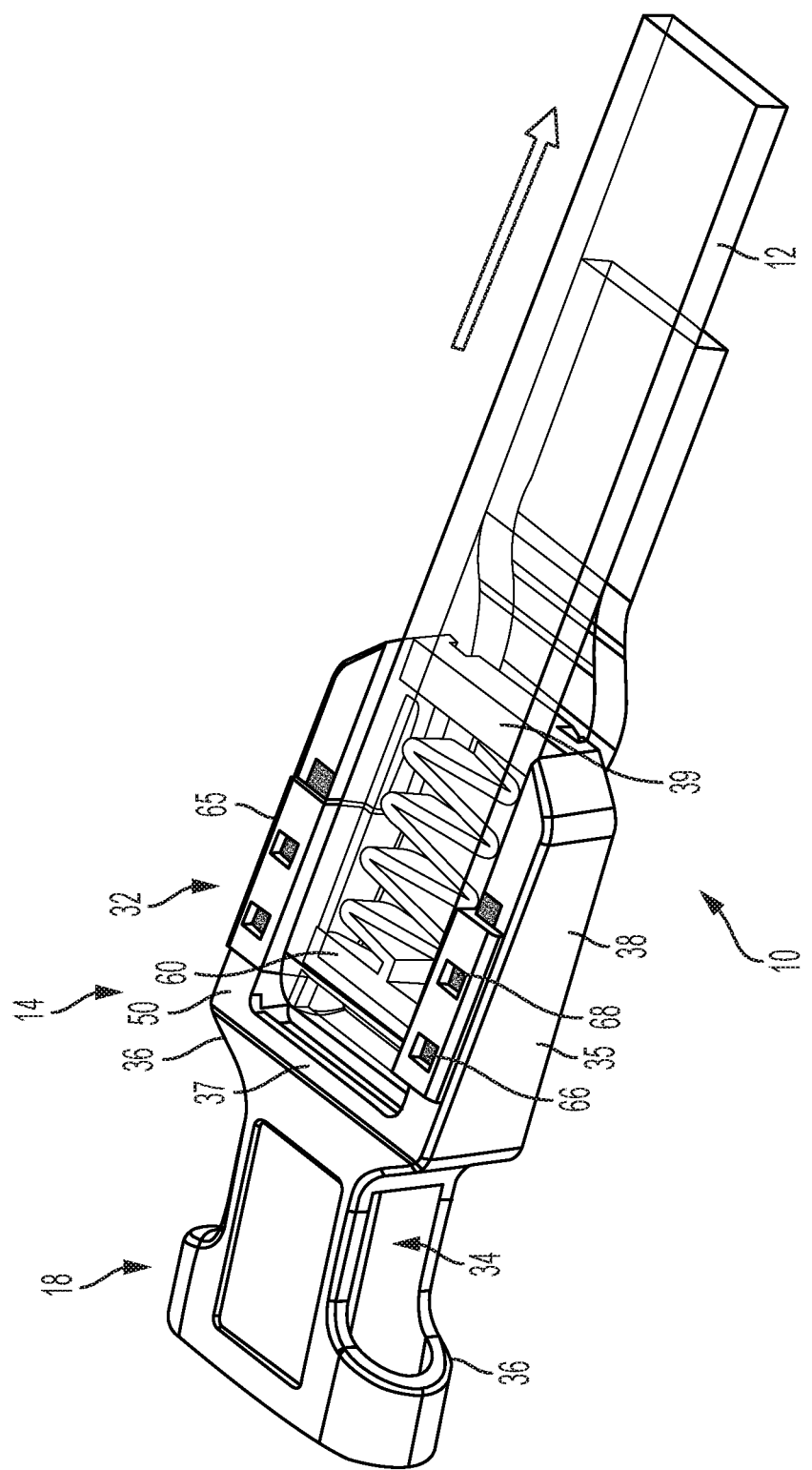
FIG. 2 is a perspective view of a buckle portion of the pet collar of FIG. 1, shown with some portions in phantom lines for clarity of explanation.

A first end 78 of the strap 12 is coupled to the clip 20 through a strap opening 76 extending through the clip 20. A second end 80 of the strap, opposite first end 78, is coupled to the receiver 18 by wrapping the second end 80 about the tensioning shuttle 60, with the second end 80 passing through the shuttle channel 41 between the tensioning shuttle 60 and the base end wall 37, as best shown in FIG. 2. The compression spring 62 biases the tensioning shuttle 60 in a longitudinal direction away from the base front wall 39 and the strap second end 80 (except for the small portion at the strap second end bite or turn) coupled to the receiver 18.

In use, a pet owner attempts to select a proper length of the strap 12 in conventional fashion by adjusting the doubled over portion of the strap 12, or by any other conventionally known manner The collar 10 is then wrapped about the pet's neck and the buckle 12 is fastened by coupling the clip 20 to the receiver 18. With the clip 20 residing within the central channel 34 of the receiver 18, the prongs 24 are outwardly biased so that their latches 26 are nested within the side notches 36 to maintain the position of the clip 20 within the receiver 18. The clip 20 may be released from the receiver 18 by manually pushing or biasing the prong latches 26 inwardly and out of the side notches 36, whereby the clip 20 may then be extracted from the receiver central channel 34.

Figure 3:
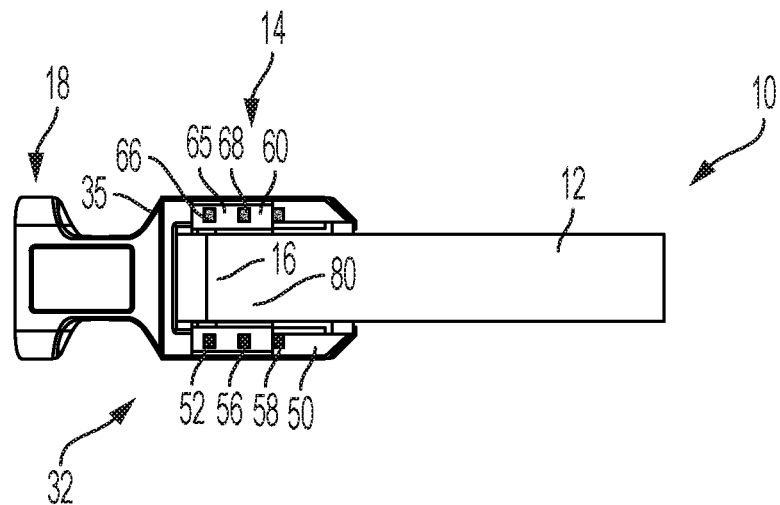
FIG. 3 is a top view of a buckle portion of the pet collar of FIG. 1, shown with the collar in a too lose configuration upon the pet.

As shown in FIG. 3, if the pet owner has mistakenly adjusted the length of the strap 12 to be too long or loose upon the pet, the first viewing window 66 is aligned with the first mark 52 and the second viewing window 68 is aligned with the third mark 56. With the color coding of red on the first and third marks 52 and 56 showing or viewable through the first and second viewing windows 66 and 68, and the exposure of the fourth mark 58 outside the position of the tensioning shuttle 60, the pet owner may immediately see that the tension/length of the strap 12 is too short or small and the collar is improperly loose. The pet owner may then remove the collar 10 and shorten the length of the strap 12 to gain a proper fit which is snugger upon the pet. This indication may also appear due to the diameter of the pet's neck decreasing over time after the initial sizing of the collar 10.

Figure 5:
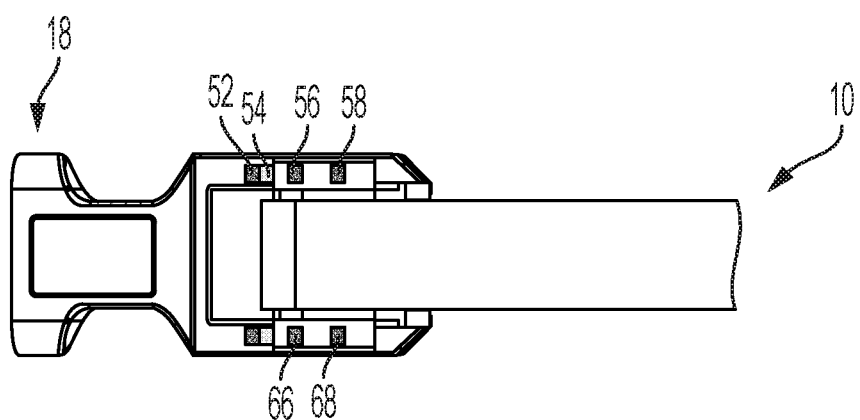
FIG. 5 is a top view of a buckle portion of the pet collar of FIG. 1, shown with the collar in a too tight configuration upon the pet.

As shown in FIG. 5, if the pet owner has mistakenly adjusted the length of the strap 12 to be too short or tight upon the pet, the first viewing window 66 is aligned with the third mark 56 and the second viewing window 68 is aligned with the fourth mark 58. With the color coding of red on the third and fourth marks 56 and 58 showing or viewable through the first and second viewing windows 66 and 68, and the exposure of the first mark 52 inside the position of the tensioning shuttle 60, the pet owner may immediately see that the tension/length of the strap 12 is too long or large and the collar is improperly tight. The pet owner may then remove the collar 10 and extend the length of the strap 12 to gain a proper fit which is looser upon the pet. This indication may also appear due to the diameter of the pet's neck increasing over time after the initial sizing of the collar 10.

Figure 4:
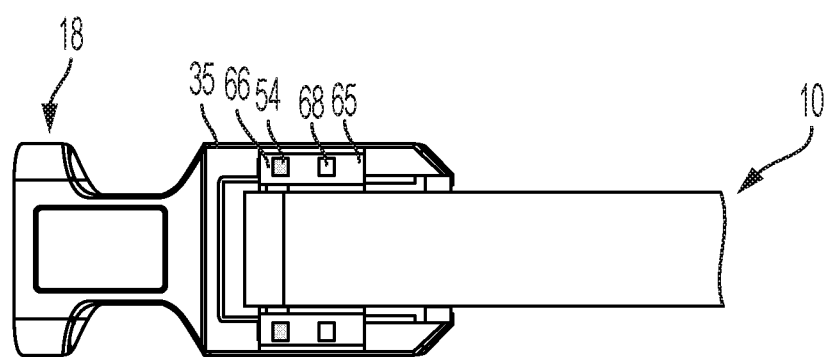
FIG. 4 is a top view of a buckle portion of the pet collar of FIG. 1, shown with the collar in a proper configuration upon the pet.

As shown in FIG. 4, if the pet owner has correctly adjusted the length of the strap 12, the first viewing window 66 is aligned with the second mark 54 and the second viewing window 68 is aligned in the blank space between the third and fourth marks 56 and 58. Alternatively, another green mark may be place between the third and fourth marks 56 and 58 to provide a secondary green indicator through the second viewing window 68. With the color coding of green on the second marks 54 showing through the first viewing windows 66, the pet owner may immediately see that the tension/length is correct.

Thus, the first viewing window 66 is aligned with the second mark 54 when the tension from the flexible strap 12 upon the tensioning shuttle 60 is of a correct preselected amount which provides for a proper fit of the collar 10 upon a pet. The first viewing window 66 is aligned with the first mark 52 and the second viewing window 68 is aligned with the third mark 56 when the tension from the flexible strap 12 upon the tensioning shuttle 50 is of an amount less than the correct preselected amount for a proper fit upon the pet. The first viewing window 66 is aligned with the third mark 56 and the second viewing window 68 is aligned with the fourth mark 58 when the tension from the flexible strap 12 upon the tensioning shuttle 60 is of an amount greater than the correct preselected amount for a proper fit upon the pet.

Thus, through the alignment of the first and second viewing windows 66 and 68 with the underlying first, second, third or fourth marks 52, 54, 56 or 58, the pet owner may immediately see, and continue to see in the future, whether or not the collar is adjusted to the proper length to provide both comfort for the pet while preventing the pet from removing the collar.

The pet collar 10 comprises a flexible strap 12 having a first end 16 and a second end 16 oppositely disposed from the first end 16. The pet collar 10 also has a buckle 14 having a clip 20 coupled to the first end of the flexible strap 12 and a receiver 18 coupled to the second end of the strap. The receiver 18 has a catch portion 30 removably coupleable to the clip 20 and a tension indicator portion 32 coupled to the catch portion 30 and the flexible strap second end. The tension indicator portion 32 has at least one side wall 38 with at least one position indicator (marks 52, 54, 56 or 58). A tensioning shuttle 60 is coupled for reciprocal movement along the one side wall 38. The tensioning shuttle 60 has a visual indictor (viewing window 66 or 68) alignable with the at least one position indicator (marks 52, 54, 56 or 58). A spring 62 biases the tensioning shuttle 60 in a longitudinal direction opposite to the tension upon the strap 12 through mounting the collar 10 upon a pet. The flexible strap second end is coupled to the tensioning shuttle 60. With this construction, the amount of tension of the flexible strap 12 determines the position of the tensioning shuttle 60 along the side wall 38 of the base 35.

The pet collar side wall 38 includes a first position indicator 52 alignable with a first position of the visual indicator (viewing window 66 or 68) to indicate a too loose tension of the flexible strap upon a pet. The second position indicator 54 is alignable with a second position of the visual indicator (viewing window 66 or 68) to indicate a correct tension of the flexible strap 12 upon a pet. The third position indicator 56 is alignable with a third position of the visual indicator (viewing window 66 or 68) to indicate a too tight tension of the flexible strap upon a pet.

The collar 10 also includes a fourth position indicator 58 and a second visual indicator 68. The first visual indicator 66 is alignable with the first position indicator 52 and the second visual indicator 68 is alignable with the third position indicator 56 to indicate not enough tension of the flexible strap 12 upon a pet. The first visual indicator 66 is alignable with the second position indicator 54 to indicate a correct tension of the flexible strap 12 upon a pet. The first visual indicator 66 is alignable with the third position indicator 56 and the second visual indicator 68 is alignable with the fourth position indicator 58 to indicate too much tension of the flexible strap 12 upon a pet.

The first, third and fourth position indicators 52, 56 and 58 have a first select color and the second position indicator 54 has a second select color different from the first select color.

The pet collar 10 comprises a flexible strap 12 having a first end and a second end 16. The pet collar 10 also has a buckle coupling the first end to the second end, and a tension indicator portion 32 coupled to the flexible strap 12. The tension indicator portion 32 has a base 35 coupled to the flexible strap 12 and a shuttle 60 coupled to the flexible strap 12 and coupled to the base 35 for reciprocal movement relative to the base 35. The base 35 has a first tension indicator. The shuttle 60 has a second tension indicator selectively alignable with the first tension indicator to indicate the amount of tension upon the flexible strap 12. The spring 62 biases the shuttle 60 relative to the base 35 against the tension force upon the strap 12.

A pet collar 10 comprises a flexible strap 12 having a first end and a second end 16 oppositely disposed from the first end. The pet collar 10 also has a buckle 14 coupling the strap first end to the strap second end. The buckle 14 has a strap coupling portion 30 and a tension indicator portion 32. The tension indicator portion 32 has a base 35 and a sliding member 60 movably mounted to the base 35 for reciprocal, longitudinal movement. The base 35 has a plurality of longitudinally aligned visual position indicators (marks 52, 54, 56 or 58). The sliding member 60 has a tension indicator (viewing windows 66 and 68) alignable with the visual position indicators (marks 52, 54, 56 or 58). The tension indicator portion 32 also have a spring 62 biasing the sliding member 60 in a first longitudinal direction. The base 35 is coupled to the first end of the flexible strap. The sliding member 60 is coupled to the second end of the flexible strap, wherein tension upon the flexible strap places a tensioning force upon the sliding member in a second longitudinal direction opposite to the first longitudinal direction created by the spring.

It should be understood that the catch portion 30 may be of any conventional configuration, such as a single, central push down catch, a magnetic coupler, a hook and loop type fastener, or a pin and hole arrangement. The catch portion 30 may also be physically separate from the tension indicator portion 32. Also, the spring 62 may be of any conventionally know design so long as it biases the tensioning shuttle 60, such as a coil spring, leaf spring, compressible resin or material, elastic material, magnets, or the like.

It should be understood that the tensioning shuttle 60 may include a single viewing window rather than the two viewing windows shown in the preferred embodiment. The use of one viewing window would eliminate the need for four marks, as a first, second and third marks may be used in conjunction with a single window to show the three possible tension conditions described above. Also, instead of using viewing windows, the tensioning shuttle 60 may use any position element, indicator or indicating means, such as a notch, projection, pointer, or the like which is alignable with the underlying marks. Similarly, the underlying marks 52, 54, 56 and 58 is not limited to a color coding and may be any type of visual indicator, such an alphanumeric code, image, icon, pattern, design, fabric, etc. Furthermore, the positions of the visual position indicator and visual tension indicator portion may be reversed, for example, the color coding may be on the reciprocal shuttle and the viewing window or pointer may be on the stationary side wall 38. As such, the terms visual position indicator, tension indicator, and visual tension indicator portion may be interchangeable as they are both considered to be tension indicators or position indicators. Lastly, the position indicator may simply be an edge of the tensioning shuttle 60 rather than a distinct and separate component of such, as the edge of the tensioning shuttle 60 may be used against an underlying set of marks upon the base 35 to indicate its relative position thereon.

Also, it should be understood that the collar 10 may be in the form of a pet harness configured to surround the neck and/or chest of a pet.

A pet collar comprises under an embodiment a flexible strap having a first end and a second end oppositely disposed from said first end. The pet collar includes a buckle having a clip coupled to said first end of said flexible strap and a receiver coupled to said second end of said strap, said receiver having a catch portion removably coupleable to said clip and a tension indicator portion coupled to said catch portion and said flexible strap second end, said tension indicator portion having at least one side wall with at least one position indicator, a tensioning shuttle coupled for reciprocal movement along said one side wall, said tensioning shuttle having at least one visual indictor alignable with said at least one position indicator, and a spring biasing said tensioning shuttle, whereby the amount of tension of the flexible strap determines the position of the tensioning shuttle along the side wall.

Said at least one visual indicator of an embodiment comprises a viewing window.

Said at least one position indicator includes a first position indicator, a second position indictor, and a third position indicator, wherein said at least one visual indicator comprises a first visual indicator, wherein the first position indicator is alignable with a first position of said visual indicator to indicate not enough tension of the flexible strap upon a pet, wherein the second position indicator is alignable with a second position of said visual indicator to indicate a correct tension of the flexible strap upon a pet, and wherein the third position indicator alignable with a third position of said visual indicator to indicate to much tension of the flexible strap upon a pet, under an embodiment.

Said at least one position indicator includes a fourth position indicator, wherein said at least one visual indicator comprises a second visual indicator, wherein said first visual indicator is alignable with said first position indicator and said second visual indicator is alignable with said third position indicator to indicate not enough tension of the flexible strap upon a pet, wherein said first visual indicator is alignable with said second position indicator to indicate a correct tension of the flexible strap upon a pet, and wherein said first visual indicator is alignable with said third position indicator and said second visual indicator is alignable with said fourth position indicator to indicate too much tension of the flexible strap upon a pet, under an embodiment.

Said first position indicator has a first select color and said second position indicator has a second select color different from said first select color, under an embodiment.

Said third position indicator is said first select color, under an embodiment.

Said first position indicator has a first select color, said second position indicator has a second select color different from said first select color, said third position indicator is said first select color, and said fourth position indicator is said first select color, under an embodiment.

Said tension indicator portion has two oppositely disposed side walls wherein each side wall has at least one position indicator, and said tensioning shuttle has two visual indicators wherein each visual indicator is alignable with said position indicator of one said side wall, under an embodiment.

A pet collar comprises under an embodiment a flexible strap having a first end and a second end. The pet collar includes a buckle coupling said first end to said second end, and a tension indicator coupled to said flexible strap, said tension indicator portion having a base coupled to said flexible strap and a shuttle coupled to said flexible strap and coupled to said base for reciprocal movement relative to said base, said base having a first tension indicator, said shuttle having a second tension indicator selectively alignable with said first tension indicator to indicate the amount of tension upon said flexible strap, and a spring biasing said shuttle relative to said base against the tension force upon the strap.

Said first tension indicator is at least one visible mark upon said base, and wherein said second tension indicator is a first position element cooperating with said at least one visible mark under an embodiment.

Said first position element is a viewing window extending through a portion of said shuttle and selectively alignable with said at least one visible mark, under an embodiment.

Said at least one visible mark includes a first position mark, a second position mark, and a third position mark, whereby the first position mark is aligned with said first position element when the tension upon the flexible strap is too small, the second position mark is aligned with said first position element when the tension upon the flexible strap is correct, and the third position mark is aligned with said first position element when the tension upon the flexible strap is too large, under an embodiment.

Said at least one visible mark includes a fourth position mark and said second tension indicator includes a second position element, wherein said first position element is selectively alignable with said first position mark and said second visual indicator is selectively alignable with said third position mark to indicate the tension upon the flexible strap is too small, wherein said first position element is selectively alignable with said second position mark to indicate a correct tension of the flexible strap upon a pet, and wherein said first position element is selectively alignable with said third position mark and said second position element is selectively alignable with said fourth position mark to indicate the tension upon the flexible strap is too large, under an embodiment.

Said first position mark has a first select color and said second position mark has a second select color different from said first select color, under an embodiment.

Said third position mark has said first select color, under an embodiment.

Said first position mark has a first select color, said second position mark has a second select color different from said first select color, said third position mark has said first select color, and said fourth position mark has said first select color, under an embodiment.

Said base has two oppositely disposed side walls each having at least one first tension indicator portion, and said shuttle has two oppositely disposed second tension indicator portions, wherein each shuttle second tension indicator portion is selectively alignable with said first tension indicator portion of each base side wall, under an embodiment.

A pet collar comprises under an embodiment a flexible strap having a first end and a second end oppositely disposed from said first end. The pet collar includes a buckle coupling said strap first end to said strap second end, said buckle having a strap coupling portion and a tension indicator portion, said tension indicator portion having a base and a sliding member movably mounted to said base for reciprocal, longitudinal movement, said base having a plurality of longitudinally aligned visual position indicators, said sliding member having a tension indicator alignable with said plurality of visual position indicators, said tension indicator portion also have a spring biasing said sliding member in a first longitudinal direction, said base being coupled to said first end of said flexible strap, said sliding member being coupled to said second end of said flexible strap wherein tension upon said flexible strap places a tensioning force upon said sliding member in a second longitudinal direction opposite to said first longitudinal direction created by said spring.

Said plurality of longitudinally aligned visual position indicators includes a first mark, a second mark, and a third mark, and wherein said tension indicator is aligned with said second mark when the tension from said flexible strap upon said sliding member is of a preselected amount, wherein said tension indicator is aligned with said first mark when the tension from said flexible strap upon said sliding member is of an amount less than said preselected amount, and wherein said tension indictor is aligned with said third mark when the tension from said flexible strap upon said sliding member is of an amount greater than said preselected amount, under an embodiment.

Said tension indicator is a viewing window extending through said sliding member and selectively alignable with said plurality of longitudinally aligned visual position indicators, under an embodiment.

Said plurality of longitudinally aligned visual position indicators includes a first mark, a second mark, and a third mark, and wherein said viewing window is aligned with said second mark when the tension from said flexible strap upon said sliding member is of a preselected amount, wherein said viewing window is aligned with said first mark when the tension from said flexible strap upon said sliding member is of an amount less than said preselected amount, and wherein said viewing window is aligned with said third mark when the tension from said flexible strap upon said sliding member is of an amount greater than said preselected amount, under an embodiment.

Variations of the pet collar may fall within the spirit of the claims, below. It will be appreciated that the inventions are susceptible to modification, variation, and change without departing from the spirit thereof.

The invention claimed is:

1. A pet collar comprising:
   a flexible strap having a first end and a second end oppositely disposed from said first end, and
   a buckle having a clip coupled to said first end of said flexible strap and a receiver coupled to said second end of said strap, said receiver having a catch portion removably coupleable to said clip and a tension indicator portion coupled to said catch portion and said flexible strap second end, said tension indicator portion having at least one side wall with at least one position indicator, a tensioning shuttle coupled for reciprocal movement along said one side wall, said tensioning shuttle having at least one visual indictor alignable with said at least one position indicator, and a spring biasing said tensioning shuttle,
   whereby the amount of tension of the flexible strap determines the position of the tensioning shuttle along the side wall.

2. The pet collar of claim 1 wherein said at least one visual indicator comprises a viewing window.

3. The pet collar of claim 1 wherein said at least one position indicator includes a first position indicator, a second position indictor, and a third position indicator, wherein said at least one visual indicator comprises a first visual indicator, wherein the first position indicator is alignable with a first position of said visual indicator to indicate not enough tension of the flexible strap upon a pet, wherein the second position indicator is alignable with a second position of said visual indicator to indicate a correct tension of the flexible strap upon a pet, and wherein the third position indicator alignable with a third position of said visual indicator to indicate to much tension of the flexible strap upon a pet.

4. The pet collar of claim 3 wherein said at least one position indicator includes a fourth position indicator, wherein said at least one visual indicator comprises a second visual indicator, wherein said first visual indicator is alignable with said first position indicator and said second visual indicator is alignable with said third position indicator to indicate not enough tension of the flexible strap upon a pet, wherein said first visual indicator is alignable with said second position indicator to indicate a correct tension of the flexible strap upon a pet, and wherein said first visual indicator is alignable with said third position indicator and said second visual indicator is alignable with said fourth position indicator to indicate too much tension of the flexible strap upon a pet.

5. The pet collar of claim 3 wherein said first position indicator has a first select color and said second position indicator has a second select color different from said first select color.

6. The pet collar of claim 5 wherein said third position indicator is said first select color.

7. The pet collar of claim 4 wherein said first position indicator has a first select color, said second position indicator has a second select color different from said first select color, said third position indicator is said first select color, and said fourth position indicator is said first select color.

8. The pet collar of claim 1 wherein said tension indicator portion has two oppositely disposed side walls wherein each side wall has at least one position indicator, and said tensioning shuttle has two visual indicators wherein each visual indicator is alignable with said position indicator of one said side wall.

9. A pet collar comprising:
   a flexible strap having a first end and a second end;
   a buckle coupling said first end to said second end, and
   a tension indicator coupled to said flexible strap, said tension indicator portion having a base coupled to said flexible strap and a shuttle coupled to said flexible strap and coupled to said base for reciprocal movement relative to said base, said base having a first tension indicator, said shuttle having a second tension indicator selectively alignable with said first tension indicator to indicate the amount of tension upon said flexible strap, and a spring biasing said shuttle relative to said base against the tension force upon the strap.

10. The pet collar of claim 9 wherein said first tension indicator is at least one visible mark upon said base, and wherein said second tension indicator is a first position element cooperating with said at least one visible mark.

11. The pet collar of claim 10 wherein said first position element is a viewing window extending through a portion of said shuttle and selectively alignable with said at least one visible mark.

12. The pet collar of claim 10 wherein said at least one visible mark includes a first position mark, a second position mark, and a third position mark, whereby the first position mark is aligned with said first position element when the tension upon the flexible strap is too small, the second position mark is aligned with said first position element when the tension upon the flexible strap is correct, and the third position mark is aligned with said first position element when the tension upon the flexible strap is too large.

13. The pet collar of claim 12 wherein said at least one visible mark includes a fourth position mark and said second tension indicator includes a second position element,
wherein said first position element is selectively alignable with said first position mark and said second visual indicator is selectively alignable with said third position mark to indicate the tension upon the flexible strap is too small,
wherein said first position element is selectively alignable with said second position mark to indicate a correct tension of the flexible strap upon a pet, and
wherein said first position element is selectively alignable with said third position mark and said second position element is selectively alignable with said fourth position mark to indicate the tension upon the flexible strap is too large.

14. The pet collar of claim 12 wherein said first position mark has a first select color and said second position mark has a second select color different from said first select color.

15. The pet collar of claim 14 wherein said third position mark has said first select color.

16. The pet collar of claim 13 wherein said first position mark has a first select color, said second position mark has a second select color different from said first select color, said third position mark has said first select color, and said fourth position mark has said first select color.

17. The pet collar of claim 9 wherein said base has two oppositely disposed side walls each having at least one first tension indicator portion, and said shuttle has two oppositely disposed second tension indicator portions, wherein each shuttle second tension indicator portion is selectively alignable with said first tension indicator portion of each base side wall.

18. A pet collar comprising:
a flexible strap having a first end and a second end oppositely disposed from said first end, and
a buckle coupling said strap first end to said strap second end, said buckle having a strap coupling portion and a tension indicator portion;
said tension indicator portion having a base and a sliding member movably mounted to said base for reciprocal, longitudinal movement, said base having a plurality of longitudinally aligned visual position indicators, said sliding member having a tension indicator alignable with said plurality of visual position indicators, said tension indicator portion also have a spring biasing said sliding member in a first longitudinal direction, said base being coupled to said first end of said flexible strap, said sliding member being coupled to said second end of said flexible strap wherein tension upon said flexible strap places a tensioning force upon said sliding member in a second longitudinal direction opposite to said first longitudinal direction created by said spring.

19. The pet collar of claim 18 wherein said plurality of longitudinally aligned visual position indicators includes a first mark, a second mark, and a third mark, and wherein said tension indicator is aligned with said second mark when the tension from said flexible strap upon said sliding member is of a preselected amount, wherein said tension indicator is aligned with said first mark when the tension from said flexible strap upon said sliding member is of an amount less than said preselected amount, and wherein said tension indictor is aligned with said third mark when the tension from said flexible strap upon said sliding member is of an amount greater than said preselected amount.

20. The pet collar of claim 18 wherein said tension indicator is a viewing window extending through said sliding member and selectively alignable with said plurality of longitudinally aligned visual position indicators.

21. The pet collar of claim 20 wherein said plurality of longitudinally aligned visual position indicators includes a first mark, a second mark, and a third mark, and wherein said viewing window is aligned with said second mark when the tension from said flexible strap upon said sliding member is of a preselected amount, wherein said viewing window is aligned with said first mark when the tension from said flexible strap upon said sliding member is of an amount less than said preselected amount, and wherein said viewing window is aligned with said third mark when the tension from said flexible strap upon said sliding member is of an amount greater than said preselected amount.

* * * * *